US006304754B1

(12) United States Patent
DeSantis et al.

(10) Patent No.: US 6,304,754 B1
(45) Date of Patent: Oct. 16, 2001

(54) SYSTEM AND METHOD FOR LAYING OUT WIRELESS CELLS TO ACCOUNT FOR CELL HANDOFF

(75) Inventors: Charles Michael DeSantis, Neptune; Susan L. Klein, Freehold; Christine T. Read, Manasquan, all of NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/324,999

(22) Filed: Jun. 2, 1999

(51) Int. Cl.$^7$ ....................................... H04Q 7/20
(52) U.S. Cl. ................ 455/436; 455/422; 455/429; 455/443; 455/446; 455/449; 455/457
(58) Field of Search ........................... 455/422, 429, 455/436, 440, 443, 446, 448, 449, 423, 424, 425, 457, 67.1

(56) References Cited

U.S. PATENT DOCUMENTS

| | | | |
|---|---|---|---|
| 5,428,816 | * 6/1995 | Barnett et al. | 455/435 |
| 5,483,669 | * 1/1996 | Barnett et al. | 455/434 |
| 5,542,097 | * 7/1996 | Ward et al. | 455/434 |
| 5,640,677 | * 6/1997 | Karlsson | 455/434 |
| 5,669,060 | * 9/1997 | Guimont | 455/436 |
| 5,787,352 | * 7/1998 | Benveniste | 455/452 |
| 5,802,473 | * 9/1998 | Rutledge et al. | 455/441 |
| 5,822,696 | * 10/1998 | Bergkvist | 455/436 |
| 5,930,721 | * 7/1999 | Fried et al. | 455/466 |
| 6,097,953 | * 8/2000 | Bonta et al. | 455/436 |
| 6,128,498 | * 10/2000 | Benveniste | 455/450 |
| 6,212,384 | * 4/2001 | Almgren et al. | 455/446 |
| 6,212,386 | * 4/2001 | Briere et al. | 455/447 |

* cited by examiner

Primary Examiner—Daniel Hunter
Assistant Examiner—Yemane Woldetatios
(74) Attorney, Agent, or Firm—Darby & Darby (57) ABSTRACT

A method for improving the display of the interaction between cells in wireless environment by a computerized site layout system is presented. Each cell has a cell boundary threshold signal level and a hand-off trigger threshold signal level. After the signal strengths of the cells throughout the environment are calculated, the signal strength data is examined to determine for a primary cell and each of its neighbor cells, in turn, a handoff region where the signal strength of said primary cell is at least equal to its cell boundary threshold signal level and the signal strength of the particular neighbor cells is at least equal to its hand-off trigger threshold signal level. The position of the primary and neighbor cells and the identified handoff regions are graphically displayed. Preferably, each cell is assigned a unique display indicium and the handoff regions are displayed using a combination of the indicia for the primary and respective neighbor cell.

14 Claims, 5 Drawing Sheets

SYSTEM AND METHOD FOR LAYING OUT WIRELESS CELLS TO ACCOUNT FOR CELL HANDOFF

TECHNICAL FIELD

This invention is related to arranging wireless cells in a wireless network to account for cell handoff. More particularly, this invention relates to a system and method for displaying the interaction between cells in a cell layout to assist in determining an optimal layout solution.

BACKGROUND OF THE INVENTION

When designing the cell layout for a wireless cellular communication system, it is necessary for the various cells to overlap enough to ensure that there are no "dead" areas in the cellular coverage area between cells. The cell overlap layout requirement generally stems from the system imposed hand-off requirements between cells. A typical requirement consists of two rules: (1) sense the occurrence of a particular trigger signal strength at the receiver, e.g., −70 dBm, and notify the system that a hand-off to a new cell is required to maintain system performance, and (2) find a suitable cell to transfer to by finding another cell with a signal strength that is at least equal to some specific target value, e.g., −65 dBm.

Figure 1:
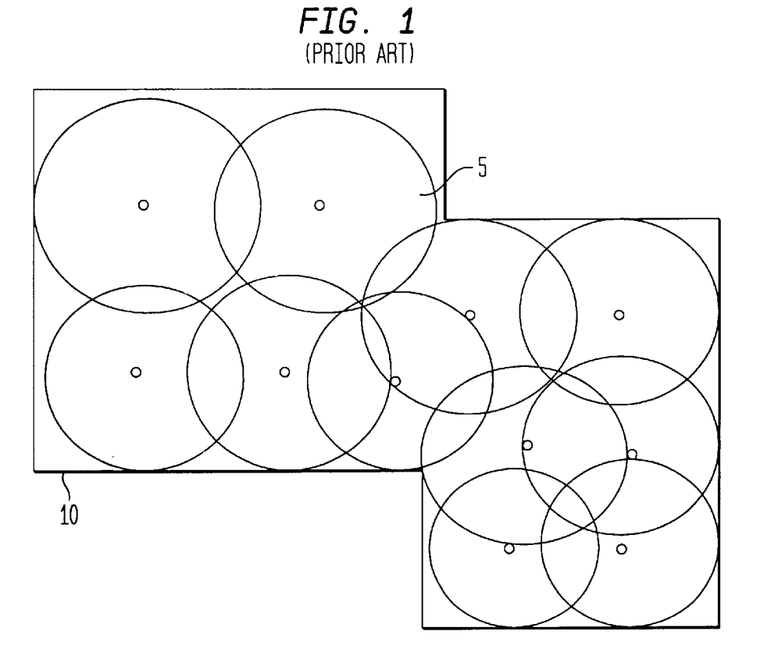
FIG. 1 shows a conventional circular cell layout.

In a free space unobstructed, environment, the shape of a cellular radio coverage area, called a cell, is circular in a plane with a size that is easily calculated. In this environment, it is relatively easy to design a cell layout which provides complete coverage without a substantial degree of overlap between the cells. Typical layout procedures based on the ideal, free-space circularly shaped cell require the designer to either ensure that all cells are touching at a particular signal strength or to ensure that all cells are overlapping at a particular signal strength. A nearly perfect layout of circular cells 5 within a defined geographic region 10 is illustrated in FIG. 1.

While the circular cell model is useful for some situations, in typical indoor environments, the shape of the cell becomes highly distorted due to signal reflections, scattering, and absorption caused by the surrounding structure and various objects within the environment. Sophisticated computer modeling of the indoor environment is used to determine the shape of a cell originating from a given point by calculating signal strength as a function of distance from the center of the cell, i.e., the signal source, with due regard for known environmental characteristics, such as the position and composition of walls, metal supports, wiring, etc.

Conventional site layout software tools, such as WiSE ("Wireless System Engineering" tool), generally include a graphical user interface ("GUI") through which the calculated shape of the cells is displayed. The user is permitted to adjust the position of the cells based on the graphically displayed information to obtain good coverage while complying with handoff requirements. The cells are typically displayed in color using a graded color map or continuous color contours of a cell, where the color grade or the contours are determined as a function of signal strength away from the center of the cell. This allows the various signal strength boundaries and cell overlap to be visualized.

As is apparent, in order to guarantee good handoff operation, the closer the cells are placed together, the greater the overlap. However, a competing design requirement is to maximize cell coverage to reduce the number of cells which are required to cover a given area. While conventional color layout tools, such as WiSE, make it easier for a layout designer to achieve complete coverage, they result in relatively conservative layouts since it is difficult to determine whether the cells are too close together, and therefore, whether more cells than necessary have been used.

Accordingly, it would be advantageous to provide a graphically based wireless cell layout tool which provides an improved visualization of the cell overlap relative to the handoff requirements that both satisfies the system hand-off requirements and at the same time maximizes cell coverage.

SUMMARY OF THE INVENTION

According to the invention, an improved system and method for indicating the hand-off region between a primary wireless cell and one or more neighbor wireless cells is presented which allows a layout designer to better maximize cell coverage while still satisfying hand-off requirements. The site layout system operates on a conventional computer system running appropriate cell layout software. Details about the surrounding environment are programmed into the system and signal strength calculations are made to determine the signal strength profiles of one or more cells at defined positions in the environment. The determined signal strengths are stored in a computer memory and made available for use by other programs running on the computer system. In addition, each cell of interest is assigned a hand-off trigger threshold signal and a cell boundary threshold signal level, indicating the signal strengths at which a handoff to another cell should be initiated and where a handoff from another cell can be accepted, respectively.

According to the invention, overlap regions between a primary cell and surrounding neighbor cells are determined based on the particular hand-off and boundary threshold regions. In particular, between the primary cell and each neighbor cell, an overlap region defined by the area where the signal strength of the primary cell is at least equal to its boundary threshold signal level and the signal strength of the neighbor cell is at least equal to its hand-off trigger threshold signal level is defined. A second set of overlap regions can also be determined where the signal strength of the primary cell is at least equal to its hand-off trigger threshold and the signal strength of the neighbor cell is at least equal to its boundary threshold signal level.

Once the overlap regions between the primary and neighbor cells are determined, the positions of the cells in the defined wireless environment are graphically indicated on a suitable display and the overlap regions between the primary cell and the neighbor cells are graphically displayed. Preferably, each cell is assigned a unique display attribute, such as a unique color or cross-hatching method. A cell's position is displayed using its unique attribute and the overlap regions are displayed using a combination of the attributes for the overlapping cells.

The graphically displayed overlap regions indicate regions where the hand-off requirements between cells are met in an easy to comprehend manner. Once an operator is able to visualize the hand-off regions in this manner, the position of the cells can be adjusted using appropriate input commands to maximize the cell spacing while at the same time also maximizing the overlap regions. Preferably when a cell position is altered by the user, the overlap regions are redetermined and the graphical display updated accordingly.

It can be appreciated by those skilled in the art that when the bi-colored overlap regions form a continuous boundary around the primary cell, full hand-off coverage is guaranteed. Preferably, an indication is provided to the operator when such a continuous boundary is present.

BRIEF DESCRIPTION OF THE DRAWINGS

The foregoing and other features of the present invention will be more readily apparent from the following detailed description and drawings of illustrative embodiments of the invention in which.

DETAILED DESCRIPTION OF THE PREFERRED EMBODIMENTS

According to the present invention, a novel method for displaying the overlap between cells in a wireless communication environment with regard to the handoff requirements is presented. The invention is preferably implemented in software in conjunction with a wireless site layout system that includes processing routines which determine the signal strength of a primary and one or more neighbor cells within a preprogrammed geometric area and store the signal strengths in a computer memory.

Figure 2:
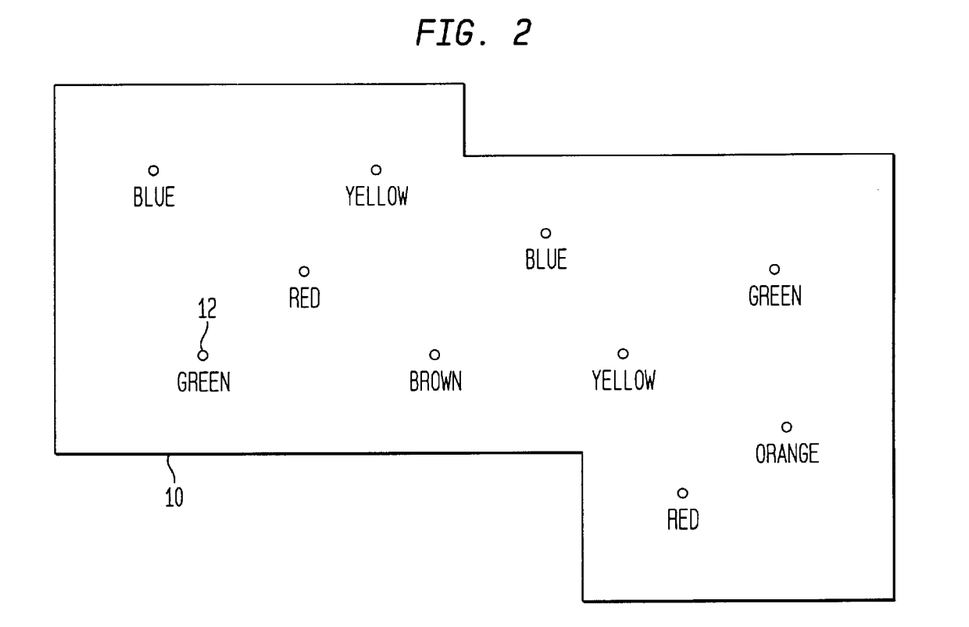
FIG. 2 shows a layout with cells having varying cell display indicia.

In accordance with the design requirements for the wireless systems, each cell is assigned a cell boundary signal level threshold, such as −65 dBm, and a hand-off trigger threshold, such as −70 dBm. In addition, each cell is assigned a display indicia, such as color. Preferably, the indicia are unique between adjacent cells. However, duplicate indicia can be used for cells which are separated by an intermediary cell. Because of the overlapping nature of the cell boundaries, a maximum of seven unique indicia is required. FIG. 2 is an example of a geographic region 10 in which the center positions of a number of wireless cells, such as cell 12, are illustrated. Each cell is assigned a display indicium, here a color, which is unique relative to neighboring cells.

Once the positions of two or more wireless cells within the geometric area have been assigned, either by default or placed by the user through a suitable interface, such as a GUI, the appropriate signal strength calculation routines of the site layout software are executed. These routines return an array of data for each cell containing the signal strength for the cell at each grid point within the geometric area.

According to the invention, once the signal strengths for the cells have been determined, a graphical display is generated which shows the overlap between cells in the manner described below. The specific steps required to generate the display depend on the computing platform and operating system and will be known to those of skill in the art.

For each "primary" cell and its one or more adjacent neighboring cells, the signal strength data for the primary cell and each respective neighbor cell is examined in turn. A first overlap region is identified which consists of grid points where the signal strength of the primary cell is at least equal to its hand-off trigger threshold signal level and the signal strength of the neighbor cell is at least equal to that cells' boundary threshold signal level. The first overlap region thus represents an area within the geometric region which complies with the handoff requirements of a wireless communication from the primary cell to the neighbor cell. A second overlap region can be identified from the opposite viewpoint and which contains those grid points where the signal strength of the neighbor cell is at least equal to its cell hand-off trigger threshold signal level and the signal strength of the primary cell is at least equal to the primary cell's boundary threshold signal level. The second overlap region represents an area which complies with the handoff requirements from the neighbor cell to the primary cell.

Figure 3:
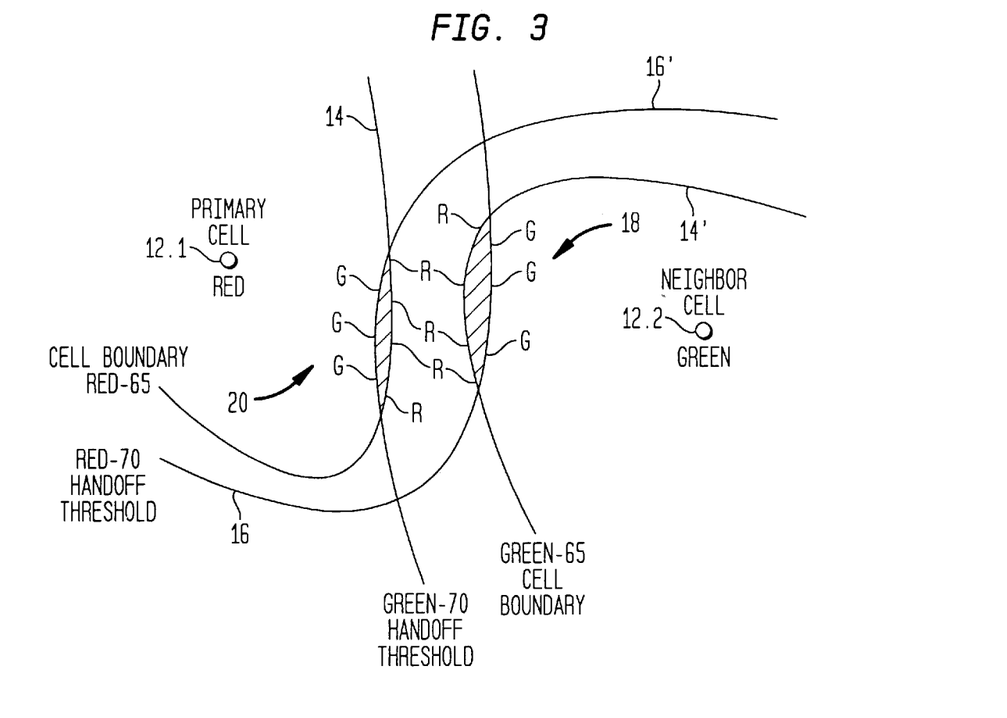
FIG. 3 shows overlap regions between two cells displayed according to the present invention.

FIG. 3 is an illustration of such overlapping regions for two cells, each of which has a cell boundary threshold of −65 dBm and a hand-off trigger threshold of −70 dBm. With reference to the figure, the primary cell 12.1 is assigned the color red as its display indicia and the neighbor cell 12.2 is assigned the color green. Although not necessary, for ease of visualization, a cell boundary contour line 14 and a hand-off threshold contour line 16 for the cells are also displayed, preferably using the indicium assigned to the respective cell. The neighbor cell 12.2 has corresponding cell boundary and hand-off threshold contour lines 14', 16'.

As illustrated, the first overlap region 18 contains those points which fall within the cell boundary 14' of the neighbor cell 12.2 and also the handoff threshold 16 of the primary cell 12.1. Similarly, the second overlap region 20 contains those points which fall within the cell boundary 14 of the primary cell and also the handoff threshold 16' of the neighbor cell 12.2.

As can be appreciated, the overlap region 18 indicates the start of the transition region wherein a wireless transceiver leaving the primary cell 12.1 can be validly handed off to the neighbor cell 12.2 as it passes the handoff threshold 16. Analogously, the overlap region 20 indicates the start of the transition region where a wireless transceiver leaving the neighbor cell 12.2 can validly be handed off into the primary cell 12.1 as it passes the handoff threshold 16'.

Preferably, the overlap regions 18, 20 are displayed using a combination of the display indicia for the primary and neighbor cell. For example, the overlap region display can comprise a series of stripes or lines having alternating colors according to the indicia of the cells at issue. In the figure, the overlap is displayed as alternating red and green stripes, as indicated by the "R" and "G" arrows. The width of the stripes or lines having colors of the primary and neighbor cells can differ to further distinguish between the two cells when the overlap regions are displayed. For example, the width of the primary cell colored lines in region 18 can be greater than that of the neighbor cell while the lines in region 20 having the primary cell color are narrower then those having the neighbor cell color. This variation will allow a viewer to easily determine whether a displayed region represents points meeting handoff requirements into the primary cell or leaving the primary cell, even if both regions are not simultaneously displayed.

Once the handoff and boundary condition overlap regions are displayed, the control is returned to the site layout system and the user is provided the option of repositioning one or more cells so as to maximize the spacing between the cells while at the same time maximizing the length of the overlap regions between cells. This repositioning routine can be done manually or, alternatively, an automated procedure can be implemented according to techniques known to those skilled in the art.

Figure 4:
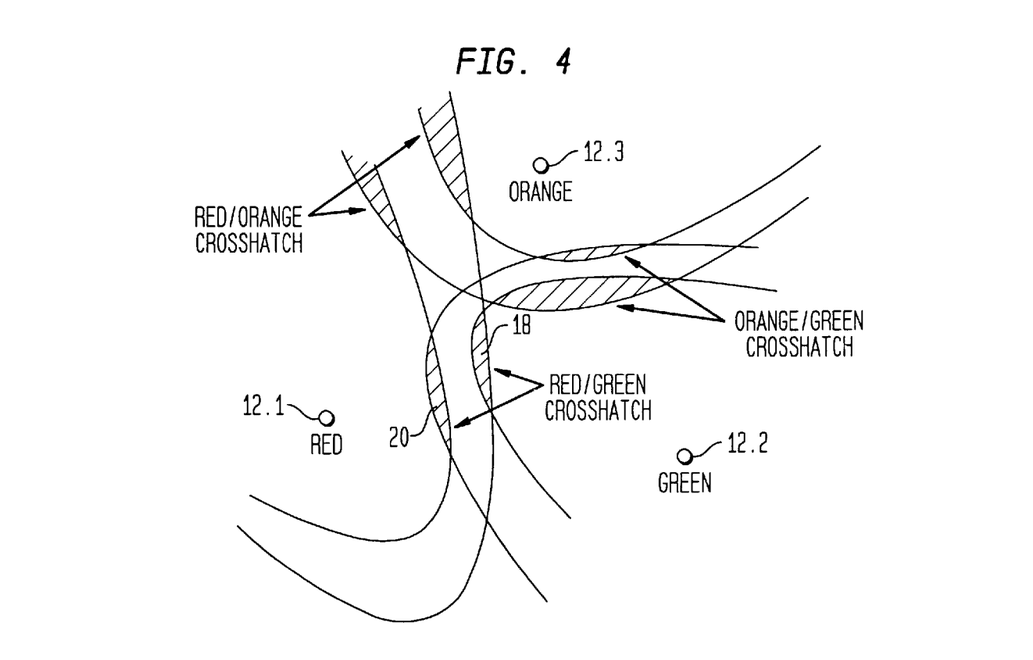
FIG. 4 shows multiple cell overlap regions with combined display indicia according to the invention.

When the user is satisfied with the position of two of the cells 12.1, 12.2, a third cell 12.3 is then placed or adjusted. The cell is generally positioned to produce two additional pairs of overlap regions, such as illustrated in FIG.4. The overlap regions between adjacent cells are displayed using a combination of the display indicia assigned to the overlapping cells. Although color is the preferred indicia, other indicia, such as varying cross-hatching patterns can be used instead. The processes are repeated until the sufficient cells have been placed to achieve the desired level of coverage.

Figure 5:
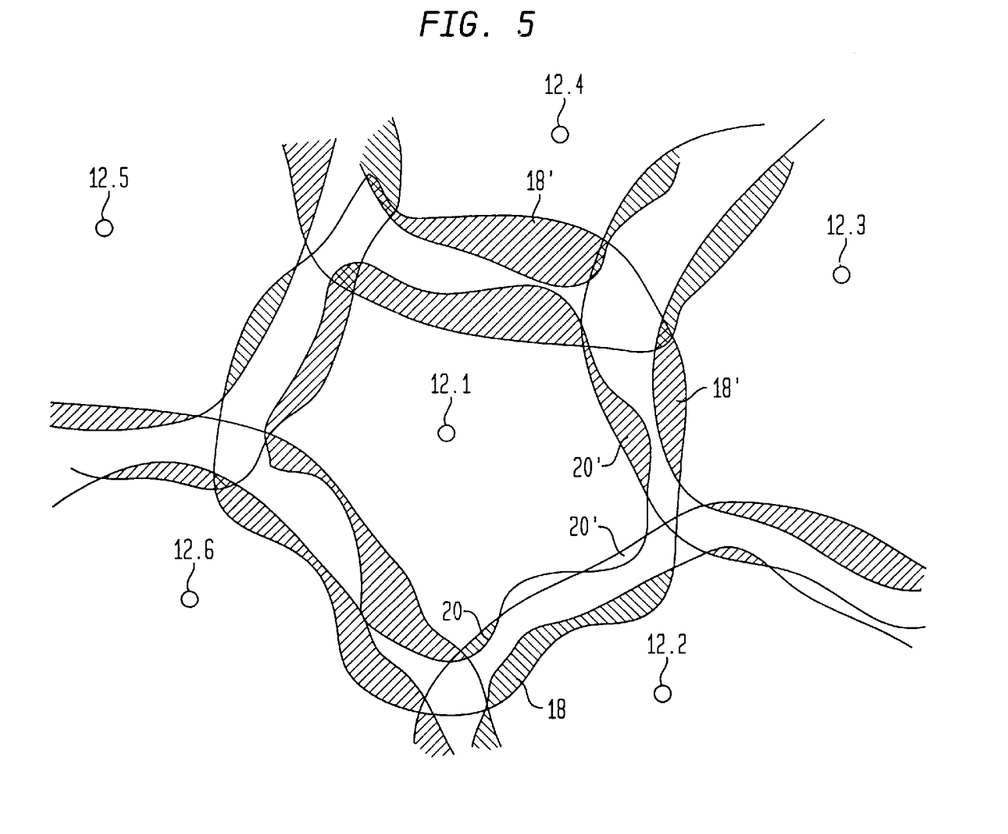
FIG. 5 shows a primary cell having a nearly perfect handoff boundary.

Displaying overlap regions within which handoff requirements are guaranteed to be met, as opposed to displaying the variable signals strength or the boundary contours of each cell and relying on the operator to determine where the requirements are met, improves the ability of an operator to determine when the handoff requirements for each particular cell in the system are fully met. To further aid in this determination, after the overlap regions for a primary cell and its neighbors are identified, they can be examined to determine whether the regions surrounding the primary cell form a continuous handoff border region. A nearly continuous handoff region border 18, 18', 18", etc., for primary cell 12.1 is illustrated in FIG. 5. Once a continuous handoff region is established around a cell, a wireless communication within the cell can be successfully handed off to one or more neighbor cells without any gaps or "dead zones" in coverage. Similarly, when the primary cell has a continuous boundary region border formed from the overlapping regions 20, 20', 20", etc., between the primary and neighboring cells, a wireless communication can be successfully handed off from any of the neighboring cell to the primary cell without any gaps in coverage. To aid in determining when continuous coverage has been achieved, the site layout software can include an analysis routine which examines the overlap regions and provides a visual or audible indication to the user when a continuous boundary is present.

It should be noted that a continuous border does not necessarily mean that the border must completely surround the cell. Instead, the border should be continuous in those areas where transmission handoffs are expected. In FIG. 5, the primary cell 12.1 is centrally located. Since wireless communications can enter and exit the cell from any direction, the border should completely surround the cell. However, a cell at the edge of the coverage area, such as in a corner or against a wall, may fully comply with the design requirements even if a continuous boundary only partially surrounds the cell.

Figure 6:
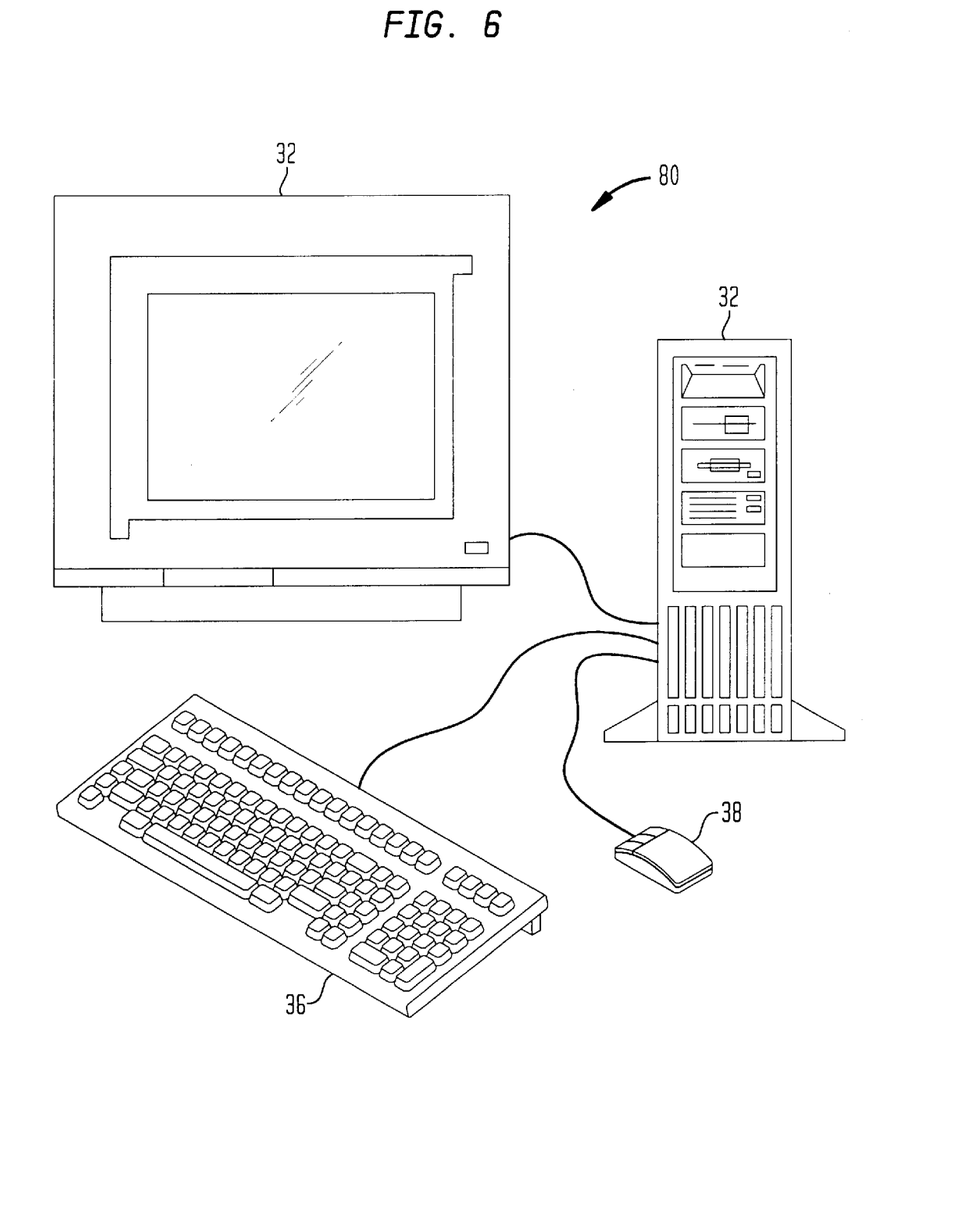
FIG. 6 is a diagram of a computer system appropriate for executing the invention.

As discussed above, the present invention is designed to be implemented as part of a computerized site layout system. A typical site layout system 30 is illustrated in FIG. 6. As indicated, the layout system 30 comprises a computer 32 with a graphical display 34 and appropriate input devices such as a keyboard 36 and a mouse 38. The computer system 32 includes a memory (not shown) and possibly other storage devices for storing the site layout software, the environmental data, and calculated cell signal levels within the environment. A central processing unit is also included for executing the programs (not shown). Although the computer 32, display 34, and input devices 36, 38 are shown directly connected to each other, it is understood that the connection may be made remotely through systems such as a LAN, an intranet, or the Internet.

Figure 7:
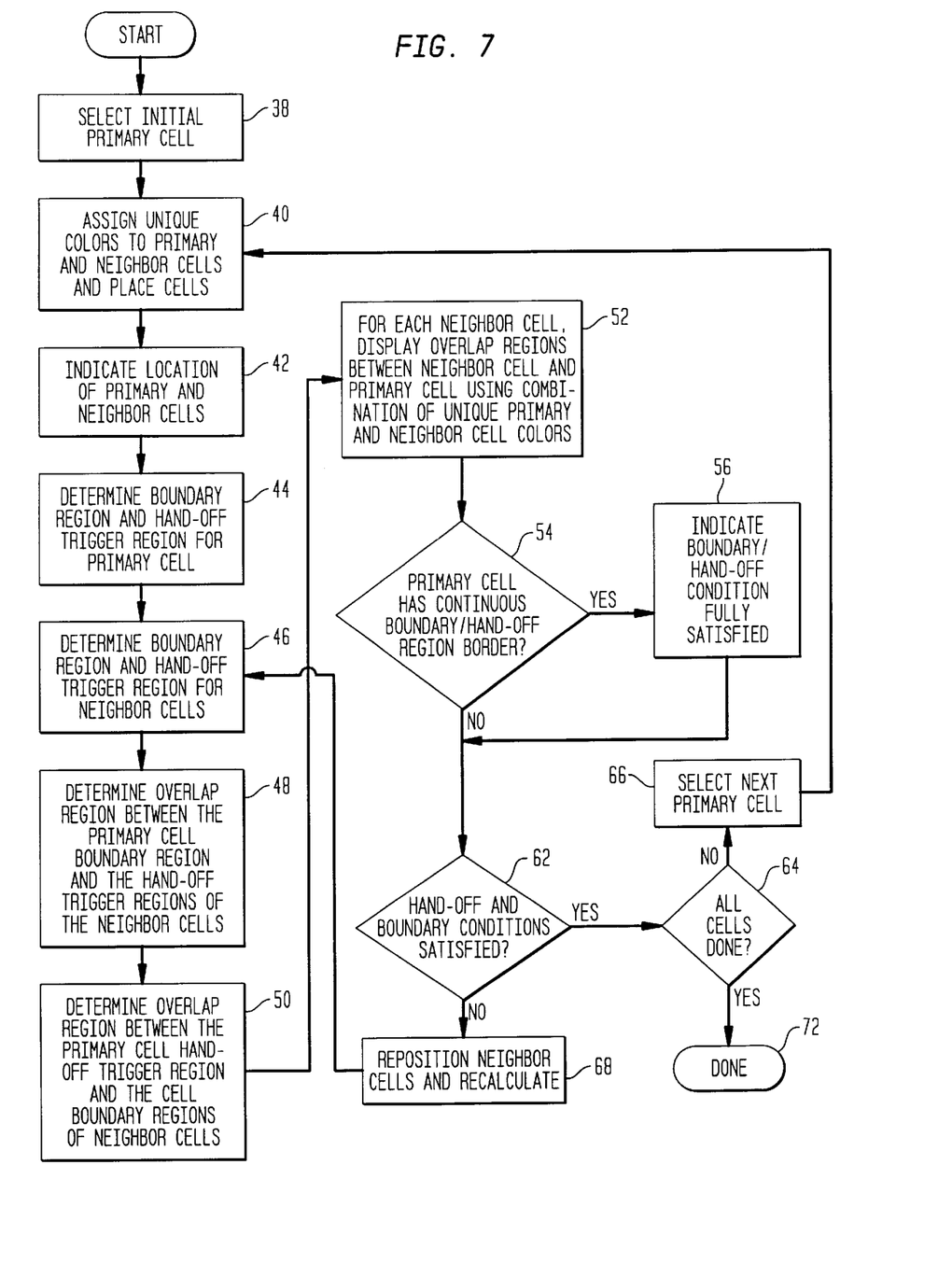
FIG. 7 is a flowchart illustrating the method of the present invention.

Turning to FIG. 7, there is shown a flowchart generally illustrating the site layout method according to the invention. Initially, the wireless cells are positioned in various locations within the modeled geographic region, one cell is selected as the primary cell (step 38) and the cells are assigned pseudo unique display indicia. (Step 40). In practice, the initial placement is made according to rules of thumb, default rules, or according to the user's experience. As the cells are placed, their locations can be indicated on the graphical display. (Step 42).

Once the cells have been placed, the boundary region and hand-off trigger region for the primary cell are determined. (Step 44). This operation is generally performed by calling the appropriate signal strength calculation routine and then analyzing the results to find those points which fall at or sufficiently close to the designated boundary and hand-off trigger signal levels. The boundary region and handoff region for each of the neighboring cells are also similarly determined. (Step 46). These steps are also useful if the boundary and handoff contours are to be displayed. However, the display of complete level contours is not required.

In general, the hand-off and boundary regions will be determined again when each of the neighboring cells, as well as all of the remaining cells of interest, becomes the primary cell under consideration in its turn. Making the boundary and hand-off region determination for all cells at this point in the process, even if not yet required, can increase the speed of the entire display process, thus making the algorithm more efficient.

Next, the co-incident or overlap areas between the boundary level contour of the primary cell and the handoff level contour of the neighboring cells is determined. (Step 48). A second set of overlap areas between the handoff level of the primary cell and the boundary of the neighbor cells can also be determined at this stage. (Step 50). Once the overlapping regions between the primary and neighboring cells have been determined, the regions are displayed using a combination of the unique display indicia for the primary and neighbor cell. (Step 52).

Preferably, the set of regions for the primary cell constituting the primary cell's boundary region which is coincident with neighboring cells' hand-off regions are also analyzed to determine whether they form a continuous boundary. If the primary cell has a continuous handoff neighbor/primary boundary region border (step 54), the system will indicate to the user that the handoff condition for the primary cell is fully satisfied. (Step 56). Various techniques for examining graphical regions to determine whether they form a closed boundary are well known to those skilled in the art and various techniques for accomplishing this path may be used.

If one or both of the handoff and boundary conditions are not satisfied (step 62), one or more of the cells can be repositioned, the signal levels recalculated, and the process repeated. (Step 68). If the (neighbor) handoff and (primary) boundary conditions for the primary cell are satisfied, the cell fully complies with design requirements.

If all of the cells in the site have been properly enclosed in a continuous contour (step 64), the site design for handoff is complete (step 72). A display of a successful design will show all cells, with neighbors that surround them, having a closed contour. Cells near the boundaries of the region will have open contours which terminate at the region boundaries. If all cells do not meet the conditions (step 64), a new cell is designated as primary (step 66) and the process continues until all cells have taken the primary cell role at least once.

As discussed above, the presently disclosed method of mapping boundary and hand-off regions between cells is well suited for use by an automated cell placement procedure. Several automated cell placement strategies can be used to place the cells to maximize coverage while minimizing the number of cells used. In each method, the determined overlap regions between cells are analyzed and the cell positions adjusted according to predefined criteria. Several different placement criteria can be used. The particular implementation is dependent on the computing operating environment and various methods for examining the determined overlap regions and adjusting the cell position in accordance with specified min-max criteria will be apparent to one of skill in the art.

In one configuration, the cell placements are adjusted to minimize the area of all overlapping (e.g., cross-hatched) regions while maintaining required cell boundary conditions, as indicated by the presence of continuous handoff/boundary borders around the cells. In another strategy, the routine is configured to minimize any areas where the regions of more than two cells are co-incident. In yet a third strategy, the cell positions are adjusted to minimize the number of adjacent cells which are needed to satisfy the desired conditions around each (primary) cell.

While the invention has been particularly shown and described with reference to preferred embodiments thereof, it will be understood by those skilled in the art that various changes in form and details may be made therein without departing from the spirit and scope of the invention.

We claim:

1. A method for indicating the hand-off region between a primary wireless cell and one or more neighbor wireless cells in a site layout system which determines the signal strength of the primary cell and one or more neighbor cells throughout a geometric area and stores said determined signal strengths in a computer memory, each of said cells having a cell boundary threshold signal level and a hand-off trigger threshold signal level, said method comprising the steps of:

determining for each particular neighbor cells a first region within said geometric area wherein the signal strength of said primary cell is at least the cell boundary threshold signal level of said primary cell and the signal strength of said particular neighbor cells is at least the hand-off trigger threshold signal level of said particular neighbor cells;

graphically indicating the position of each of said primary cell and each of said neighbor cells within said geometric area; and graphically indicating said determined first region for each particular neighbor cell.

2. The method of claim 1, further comprising the steps of:

determining for each particular neighbor cell a second region within said geometric area wherein the signal strength of said primary particular neighbor cell is at least the cell boundary threshold signal level of said particular neighbor cell and the signal strength of said primary cell is at least the hand-off trigger threshold signal level of said primary cell; and graphically indicating said determined second region for each particular neighbor cell.

3. The method of claim 1, further comprising the step of indicating when said first regions form a continuous boundary around the primary cell.

4. The method of claim 1, further comprising the step of uniquely assigning a display attribute to said primary cell and each of said neighbor cells;

the position of the primary cell and the neighbor cells being graphically indicated using the respective unique display attribute;

said first determined region for each respective neighbor cell being graphically indicated using a combination of the unique display attribute of the primary cell and the unique display attribute of the respective neighbor cell.

5. The method of claim 4, wherein said unique display attribute is one of display color and cross-hatching.

6. The method of claim 1, further comprising the steps of:

determining in response to the repositioning one of the neighbor cells and associated translation of the stored determined signal strengths for said repositioned neighbor cell a modified first region within said geometric area wherein the signal strength of said primary cell is at least the cell boundary threshold signal level of said primary cell and the translated signal strength of said particular neighbor cell is at least the hand-off trigger threshold signal level of said repositioned neighbor cell;

graphically indicating said determined modified first region for said repositioned neighbor cell.

7. In a computer system for designing the layout of wireless cells in a wireless environment including a primary cell and one or more neighbor cells, each of said cells having a cell boundary threshold signal level and a hand-off trigger threshold signal level, the system including a memory and a processor, the memory containing information describing a wireless environment, the processor being configured to determine the signal strength of wireless cells at various points within said wireless environment, the improvement comprising:

said processor being further configured to:

determine for each particular neighbor cell a first region within said wireless environment wherein the signal strength of said primary cell is at least the cell boundary threshold signal level of said primary cell and the signal strength of said particular neighbor cells is at least the hand-off trigger threshold signal level of said particular neighbor cells;

graphically indicate on a display the position of said primary and each of said neighbor cells in a representation of the wireless environment; and graphically indicate on the display said determined first region for each particular neighbor cell.

8. The system of claim 7, wherein said processor is further configured to:

determine for each particular neighbor cell a second region within said wireless environment wherein the signal strength of said primary particular neighbor cell is at least the cell boundary threshold signal level of said particular neighbor cell and the signal strength of said primary cell is at least the hand off trigger threshold signal level of said primary cell; and graphically indicate on the display said determined second region for each particular neighbor cell.

9. The system of claim 7, wherein said processor is further configured to indicate when said first regions form a continuous boundary around the primary cell.

10. The system of claim 7, wherein each of said primary cell and said neighbor cells is assigned a unique display attribute; said processor being further configured to:

indicate the position of the primary cell and the neighbor cells on said display using the respective unique display attribute; and indicate said first region determined for each respective neighbor cell using a combination of the unique display attribute of the primary cell and the unique display attribute of the respective neighbor cell.

11. In a computer system for designing the layout of wireless cells in a wireless environment including a primary cell and one or more neighbor cells, each of said cells having a cell boundary threshold signal level and a hand-off trigger threshold signal level in accordance with predefined handoff requirements, the system including a memory and a processor, the memory containing information describing a wireless environment, the processor being configured to determine the signal strength of wireless cells at various points within said wireless environment, the improvement comprising:

said processor being further configured to:

determine for each particular neighbor cell a first region within said wireless environment wherein the signal strength of said primary cell is at least the cell boundary threshold signal level of said primary cell and the signal strength of said particular neighbor cells is at least the hand-off trigger threshold signal level of said particular neighbor cells;

determine for each particular neighbor cell a second region within said wireless environment wherein the signal strength of said primary particular neighbor cell is at least the cell boundary threshold signal level of said particular neighbor cell and the signal strength of said primary cell is at least the hand-off trigger threshold signal level of said primary cell;

analyze the determined overlap regions between cells;

adjust a position of at least one of said primary and one or more neighbor cells according to predefined criteria; and graphically indicate on a display the position of said primary and each of said neighbor cells in a representation of the wireless environment, said determined first and second regions.

12. The system of claim 11, wherein said predefined criteria comprise said predefined handoff requirements.

13. The system of claim 12, wherein said predefined criteria further comprise maximize geographic coverage of said primary and one or more neighbor cells.

14. The system of claim 12, wherein said predefined criteria further comprise minimizing an area of said overlap regions.

* * * * *